United States Patent [19]

Nisenbaum

[11] Patent Number: 5,054,830

[45] Date of Patent: Oct. 8, 1991

[54] SHOVEL

[76] Inventor: Philip Nisenbaum, P.O. Box 214133, Sacramento, Calif. 95821

[21] Appl. No.: 667,243

[22] Filed: Mar. 8, 1991

Related U.S. Application Data

[63] Continuation of Ser. No. 447,437, Dec. 7, 1989, abandoned, which is a continuation-in-part of Ser. No. 346,580, May 2, 1989, which is a continuation-in-part of Ser. No. 824,735, Jan. 31, 1986, Pat. No. 4,824,427.

[51] Int. Cl.$^5$ .......... B25G 1/00; A01B 1/00

[52] U.S. Cl. .......... 294/58; 16/111 R

[58] Field of Search .......... 16/111 R, 112; 294/58, 294/54.5

[56] References Cited

U.S. PATENT DOCUMENTS

| | | | |
|---|---|---|---|
| 1,374,061 | 4/1921 | Coleman | 294/58 |
| 2,521,441 | 9/1950 | Bickley | 294/58 |
| 2,772,910 | 12/1956 | Doyle | 294/58 |
| 2,826,835 | 3/1958 | O'Shea | 294/58 |
| 3,155,414 | 11/1964 | Bales | 294/58 |
| 4,050,728 | 9/1977 | Davidson | 16/114 R |
| 4,691,954 | 9/1987 | Shaud | 294/54.5 |

FOREIGN PATENT DOCUMENTS

| | | | |
|---|---|---|---|
| 322531 | 12/1929 | United Kingdom | 294/58 |

*Primary Examiner*—Robert L. Spruill
*Assistant Examiner*—Carmine Cuda
*Attorney, Agent, or Firm*—Jerry T. Kearns

[57] ABSTRACT

A shovel includes an elongated cylindrical shaft having a shovel blade removably secured by a pin and socket connection at a first end, and a first D-shaped hand grip at a second opposite end. A split cylindrical clamping collar includes a clamping screw for securing the collar at a selected position around the shaft. A lateral extension member is pivotally mounted to the clamping collar for movement about an axis which extends parallel to a longitudinal axis of the shaft. A second D-shaped hand grip is secured on a free end portion of the extension member. In use, an individual grasps one of the hand grips in each hand and rotates the first hand grip while holding the second hand grip secured to the lateral extension member stationary, to dump the contents of the shovel blade. The shovel handle construction is particularly adapted for use on snow shovels, and allows an individual to work with a minimum of effort and back strain.

6 Claims, 3 Drawing Sheets

SHOVEL

BACKGROUND OF THE INVENTION

This application is a continuation of U.S. Pat. Ser. No. 07/447,437, filed 12/7/89, now abandoned, which is a continuation-in-part of U.S. Pat. Ser. No. 07/346,580, filed 5/2/89, pending which is a continuation-in-part of U.S. Pat. Ser. No. 06/824,735, filed 1/31/86, and now U.S. Pat. 4,824,427. The entire disclosure of U.S. Pat. Ser. No. 07/346,580, is incorporated by reference herein.

1. Field of the Invention

The present invention relates to shovels, and more particularly pertains to an improved tool handle adapted for use with shovels. The conventional form of shovel includes an elongated shaft having a hand grip portion at one end and a shovel blade at an opposite end. In order to utilize such a conventional shovel, an individual grasps an intermediate portion of the shaft with one hand and the hand grip portion of the shovel with the other hand. This forces the individual to bend over to an uncomfortable position, and creates the potential for serious back injury, and additionally results in an ergonometrically inefficient working position.

2. Description of the Prior Art

Various conventional shovels are known in the prior art. Typical examples of such conventional shovel designs include snow shovels having an elongated cylindrical shaft with a wide, slightly arcuate blade secured at one end and a D-shaped hand grip at an opposite end. A wide variety of collapsing and portable shovels, such as the U.S. Army issue portable entrenching shovel are also known. However, none of these prior art shovels provide a lateral extension member having a second hand grip for adjustable connection to an elongated shovel shaft. Additionally, none of the aforementioned prior art shovels allow the contents of a shovel blade to be dumped by rotating the shovel shaft while holding a second hand grip in a stationary position. Accordingly, it can be appreciated that there is a continuing need for and interest in improvements to such shovels, and in this respect, the present invention addresses this need and interest.

SUMMARY OF THE INVENTION

In view of the foregoing disadvantages inherent in the known types of shovels now present in the prior art, the present invention provides an improved shovel. As such, the general purpose of the present invention, which will be described subsequently in greater detail, is to provide a new and improved shovel which has all the advantages of the prior art shovels and none of the disadvantages.

To attain this, a representative embodiment of the concepts of the present invention is illustrated in the drawings and makes use of a shovel which includes an elongated cylindrical shaft having a shovel blade removably secured by a pin and socket connection at a first end, and a first D-shaped hand grip at a second opposite end. A split cylindrical clamping collar includes a clamping screw for securing the collar at a selected position around the shaft. A lateral extension member is pivotally mounted to the clamping collar for movement about an axis which extends parallel to a longitudinal axis of the shaft. A second D-shaped hand grip is secured on a free end portion of the extension member. In use, an individual grasps one of the hand grips in each hand and rotates the first hand grip while holding the second hand grip secured to the lateral extension member stationary to dump the contents of the shovel blade. The shovel handle construction is particularly adapted for use on snow shovels, and allows an individual to work with a minimum of effort and back strain.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the public generally, and especially those who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved shovel which has all the advantages of the prior art shovels and none of the disadvantages.

It is another object of the present invention to provide a new and improved shovel which may be easily and efficiently manufactured and marketed.

It is a further object of the present invention to provide a new and improved shovel which is of a durable and reliable construction.

An even further object of the present invention is to provide a new and improved shovel which is susceptible of a low cost of manufacture with regard to both materials and labor, and which accordingly is then susceptible of low prices of sale to the consuming public, thereby making such shovels economically available to the buying public.

Still yet another object of the present invention is to provide a new and improved shovel which provides in the apparatuses and methods of the prior art some of the advantages thereof, while simultaneously overcoming some of the disadvantages normally associated therewith.

Still another object of the present invention is to provide a new and improved shovel which eliminates back strain during shovel usage.

Yet another object of the present invention is to provide a new and improved shovel having an efficient ergonometric design which allows an individual to perform a larger amount of work in a given time period.

Even still another object of the present invention is to provide a new and improved attachment which may be retrofitted to conventional shovels.

These together with other objects of the invention, along with the various features of novelty which characterize the annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
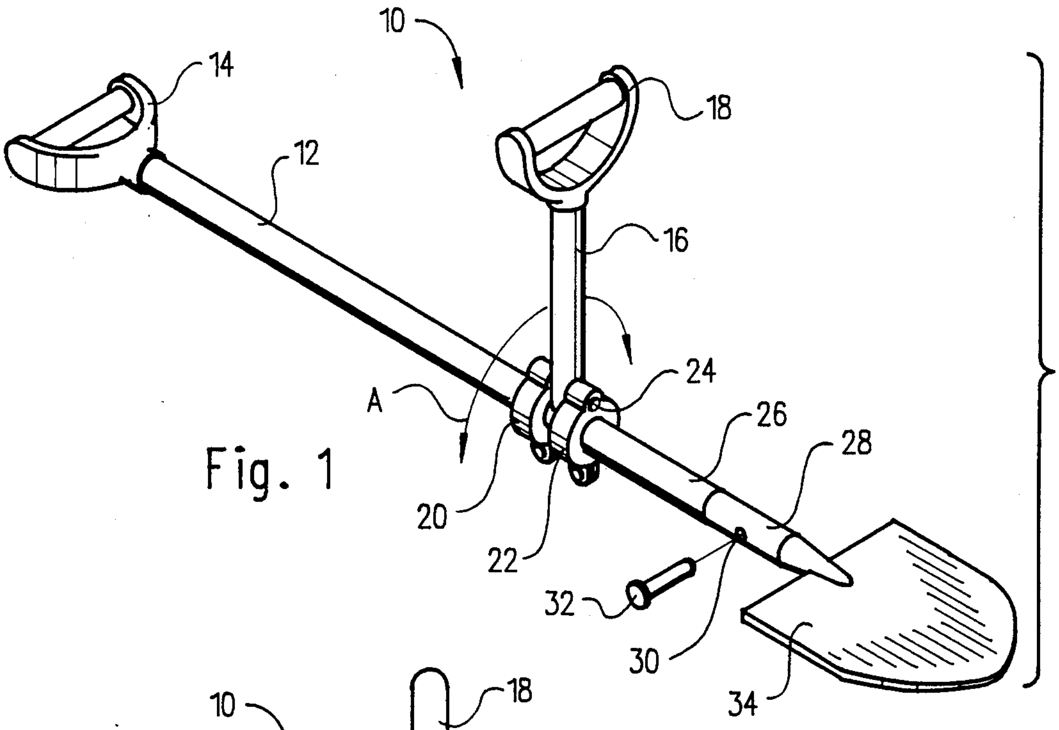
FIG. 1 is a perspective view of the shovel according to the present invention.

With reference now to the drawings, and in particular to FIG. 1 thereof, a new and improved shovel embodying the principles and concepts of the present invention and generally designated by the reference numeral 10 will be described.

More specifically, it will be noted that the first embodiment 10 of the invention includes an elongated cylindrical shaft 12 having a first D-shaped hand grip 14 at one end. An extension member 16 is in the form of a straight cylindrical shaft and has a second D-shaped hand grip 18 secured at a free end thereof. A clamping mechanism for securing the extension member 16 to the shovel shaft 12 includes a pair of split cylindrical collars 20 and 22, each having a central cylindrical bore dimensioned for frictional engagement with the shaft 12. The radially inner end of the extension member 16 is secured between the clamping collars 20 and 22 by a pivot pin 24. The shovel handle shaft 12 and extension member 16 are thus mounted for relative pivotal movement about the axis of the pin 24, which extends in spaced parallel relation with respect to a longitudinal axis of the shaft 12. This relative pivotal movement is illustrated by the arrow A. A distal end portion 26 of the shaft 12 is connected to a socket portion 28 of a shovel blade 34. A transverse aperture 30 is formed through the socket 28 and is dimensioned to receive a retaining pin 32. It should be understood that while a spade-like configuration has been illustrated for the shovel blade 34, a wide variety of different several blade configurations may be employed, without departing from the scope of the present invention. For example, a wide snow shovel type blade may be employed.

Figure 2:
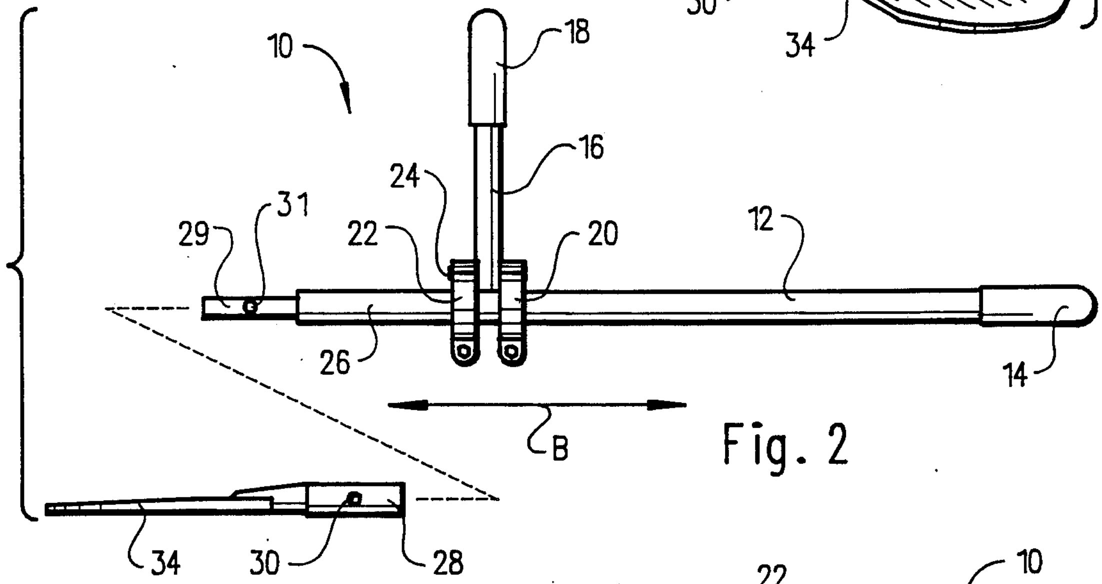
FIG. 2 is an exploded side view illustrating the removable connection of the shovel blade.

As shown in FIG. 2, the distal end portion 26 of the shaft 12 terminates in a reduced diameter cylindrical plug 29 having a transverse aperture 31 dimensioned for registry with the transverse aperture 30 formed through the shovel blade socket 28. As indicated by the arrow B, clamping collars 20 and 22 are adjustable along the length of the shaft 12, to allow a custom configuration depending upon the size of the individual user, and the intended working conditions.

Figure 3:
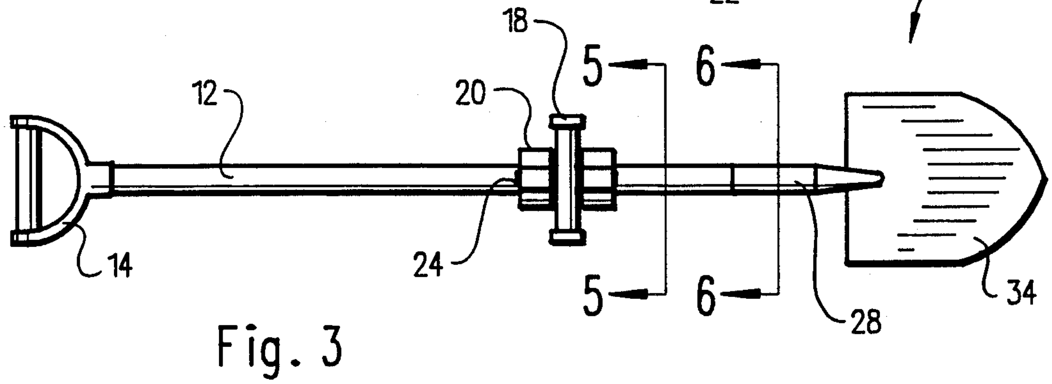
FIG. 3 is a top plan view of the shovel of FIG. 1.

FIG. 3 is a top plan view which further illustrates the configuration of the shovel 10. It should be noted that the hand grip 18 is oriented generally perpendicular to the hand grip 14.

Figure 4:
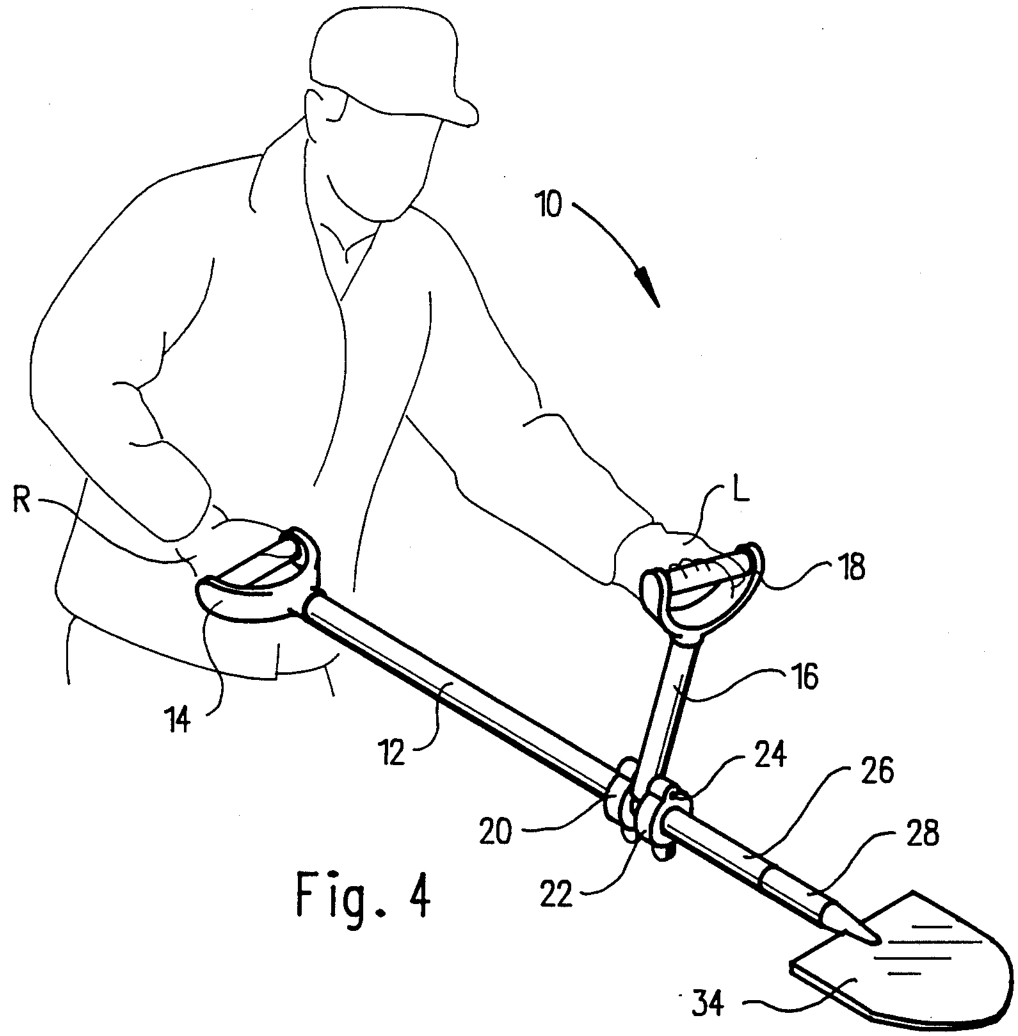
FIG. 4 is a perspective view illustrating the manner of use of the shovel of the present invention.

FIG. 4 is a perspective view which illustrates the manner of use of the shovel 10. A right handed individual grasps the hand grip 14 in their right hand R, and grasps the hand grip 18 in their left hand L. The individual then controls the shovel blade 34 utilizing both hands and scoops a quantity of dirt, snow or other material onto the blade 34. To dump the accumulated contents of the blade 34, the individual maintains the left hand and arm L in a stationary position, while rotating the right hand and arm R to rotate the shaft 12. This working position allows an erect posture, which minimizes the strain placed on the user's back. Additionally, the lateral extension 16 and hand grip 18 allows the muscular force of the shoulders to be more effectively utilized.

Figure 5:
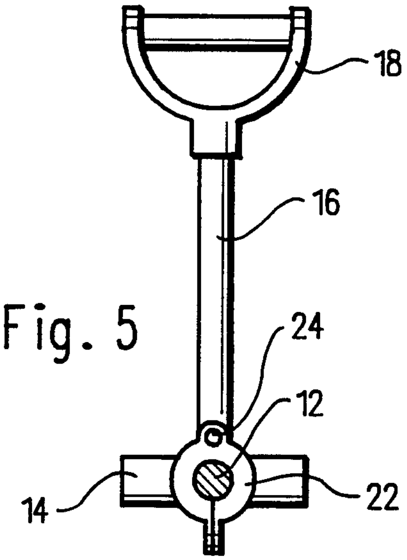
FIG. 5 is a transverse cross sectional view, taken along line 5—5 of FIG. 3.

FIG. 5 is a cross sectional view, taken along line 5—5 of FIG. 3, which illustrates the clamping collar 22 disposed around the shaft 12.

Figure 6:
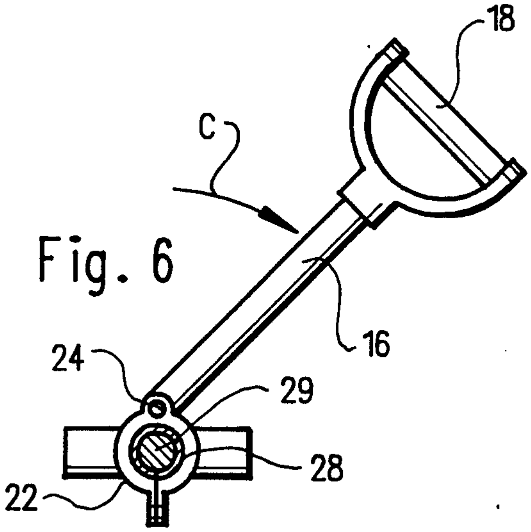
FIG. 6 is a transverse cross sectional view, taken along line 6—6 of FIG. 3.

FIG. 6 is a cross sectional view, taken along line 6—6 of FIG. 3, which illustrates the plug portion 29 of the shovel handle 21 received within the shovel blade socket 28. As indicated by arrow C, the extension member 16 is pivotal about the axis of the pin 24, which extends generally parallel to the central longitudinal axis of the collar 22.

Figure 7:
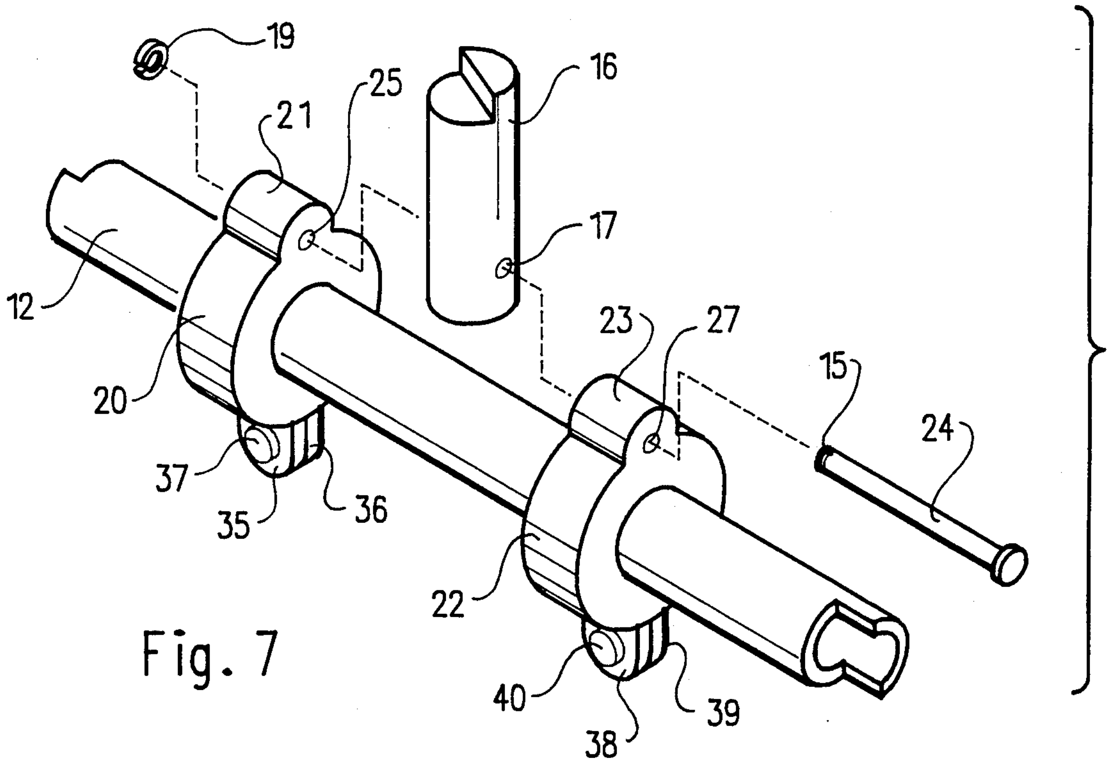
FIG. 7 is an exploded perspective detail view illustrating the extension member attachment clamp construction.

FIG. 7 is a detail view which further illustrates the construction of the lateral extension member clamping and pivotal mounting assembly. The inner end of the lateral extension member 16 is provided with a transverse cylindrical bore 17. The clamping collars 20 and 22 have respective boss portions 21 and 23, each provided with a respective cylindrical bore 25 and 27. In use, the collars 20 and 22 are oriented with the apertures 25 and 27 disposed in axial alignment. The pivot pin 24 is then inserted through the apertures 27, 17 and 25. The pin 24 may be provided with a circumferential groove 15 for registry with a conventional snap ring 19. Alternatively, the pivot pin 24 may comprise a rivet, or may utilize cooperating threaded fasteners. The clamping collars 20 and 22 have central, axially extending cylindrical bores dimensioned to receive the shaft 12. Additionally, the split collars 20 and 22 have respective radially outwardly extending aligned tabs 35, 36 and 38, 39. These tabs are adapted to be clamped together by fasteners 37 and 40. The fasteners 37 and 40 may take the form of conventional threaded fasteners, or rivets. Preferably, threaded fasteners are employed to allow the clamping collars 20 and 22 to be released from clamping engagement with the shaft 12, to allow adjustment of the extension member 16 mounting position along the length of the shaft 12.

Figure 8:
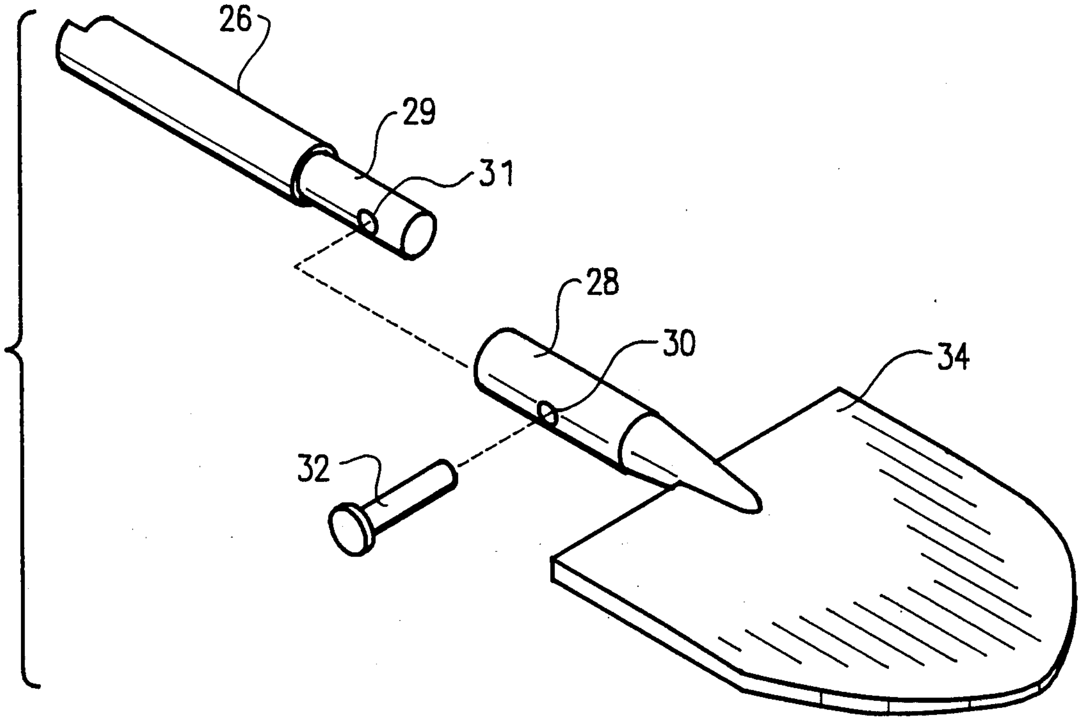
FIG. 8 is an exploded perspective detail view illustrating the removable shovel blade connection.

FIG. 8 illustrates the details of the removable connection of the shovel blade 34. The shovel blade 34 includes a hollow cylindrical socket 28 dimensioned to receive a reduced diameter cylindrical plug 29 formed on the distal end portion 26 of the shovel handle shaft. After insertion of the plug 29 into the socket 28, the retaining pin 32 is inserted through the aligned apertures 30 and 31. The retaining pin 32 may take the form of a conventional threaded fastener, snap pin, or cotter pin, without departing from the scope of the present invention. Additionally, it should be understood that the positions of the socket 28 and plug 29 may be reversed. While a shovel blade is preferred, other forms of tool blades may be employed, including those disclosed in parent application S.N. 07/346,580. The tool blade securing structure disclosed therein may also be employed.

Other alternatives which, are considered to be within the scope of the present invention, include the modification of the clamping assembly for securing the lateral extension member 16 to the shaft 12. The clamping assembly may take the form of a single, integral one piece split collar, or any similar mechanism. Additionally, the extension member 16, while illustrated in the preferred straight cylindrical) shaft configuration, may have a forwardly or rearwardly angled offset construction. It should additionally be noted that the extension member 16 may form an attachment, adapted to be retrofitted by to an existing shovel or other tool handle.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letter Patent of the United States is as follows:

1. A shovel, comprising:

an elongated shaft having first and second opposite ends;

means securing a shovel blade at said first end of said shaft;

a first hand grip at said second end of said shaft, said first hand grip including a first linear bar extending perpendicular to said elongated shaft;

a pair of split cylindrical collars;

fastening means securing said split cylindrical collars in axially spaced, frictional engagement around said elongated shaft in a selected adjustable axial position on said shaft;

a lateral extension member extending perpendicular to said elongated shaft between said split cylindrical collars;

a second hand grip on said lateral extension member, said second hand grip including a second linear bar extending perpendicular to said elongated shaft and said lateral extension member; and a pivot pin extending between said split cylindrical collars and transversely through said lateral extension member, said pivot pin pivotally mounting said lateral extension member for selective movement in either opposite rotational direction about a pivot axis parallel to longitudinal axes of said shaft and said split cylindrical collars and constraining said lateral extension member from pivotal movement about axes oblique and perpendicular to said longitudinal axes of said shaft and split cylindrical collars, said pivot axis lying in a plane perpendicularly bisecting said elongated shaft, said first and second linear bars and said shovel blade.

2. The shovel of claim 1, wherein said first hand grip comprises a D-shaped handle.

3. The shovel of claim 1, wherein said second hand grip comprises a D-shaped handle.

4. The shovel of claim 1, wherein said first and second hand grips each comprise a D-shaped handle.

5. The shovel of claim 1, further comprising means removably mounting said shovel blade on said shaft.

6. The shovel of claim 5, wherein said shaft and said shovel blade are secured by a pin and socket connection.

* * * * *